United States Patent
Peterson et al.

(10) Patent No.: US 6,196,552 B1
(45) Date of Patent: Mar. 6, 2001

(54) SEAL ASSEMBLY FOR ANNULAR HYDRAULIC CYLINDER

(75) Inventors: David C. Peterson, Walled Lake; Rajiv Iyer, Rochester, both of MI (US)

(73) Assignee: Automotive Products (USA), Inc., Auburn Hills, MI (US)

( * ) Notice: Subject to any disclaimer, the term of this patent is extended or adjusted under 35 U.S.C. 154(b) by 0 days.

(21) Appl. No.: 09/092,743

(22) Filed: Jun. 8, 1998

(51) Int. Cl.$^7$ .................................. F16J 9/28; F16J 15/32
(52) U.S. Cl. .................. 277/437; 277/439; 277/566; 277/575
(58) Field of Search .................... 277/436, 437, 277/438, 439, 566, 572, 575; 264/259, 264, 271.1, 273, 274

(56) References Cited

U.S. PATENT DOCUMENTS

| | | |
|---|---|---|
| 4,281,590 * | 8/1981 | Weaver . |
| 4,382,972 | 5/1983 | Willis et al. . |
| 4,428,590 | 1/1984 | Pippert et al. . |
| 4,821,627 | 4/1989 | Leigh-Monstevens . |
| 4,827,834 | 5/1989 | Leigh-Monstevens . |
| 5,092,125 | 3/1992 | Leigh-Monstevens . |
| 5,275,387 * | 1/1994 | Cotter et al. . |
| 5,287,951 * | 2/1994 | Voit et al. . |

FOREIGN PATENT DOCUMENTS

| | | |
|---|---|---|
| 871236 | 7/1943 | (DE) . |
| 2324178 | 6/1972 | (DE) . |
| 26 54 452 | 6/1978 | (DE) . |
| 0 092 823 A2 | 11/1983 | (EP) . |
| 1428571 | 1/1966 | (FR) . |
| 675545 | 12/1966 | (FR) . |
| 1528824 | 6/1968 | (FR) . |
| 561189 | 5/1944 | (GB) . |
| 805253 | 12/1958 | (GB) . |
| 867640 | 5/1961 | (GB) . |
| 1026354 | 4/1966 | (GB) . |
| 1075111 | 7/1967 | (GB) . |
| 1437358 | 5/1976 | (GB) . |

OTHER PUBLICATIONS

Print showing concentric slave cylinder seal produced by FTE FAHKRZEUGTECHNIK EBERN GmbH for General Motors Opel Vetrex, Mar. 1996.

* cited by examiner

Primary Examiner—Anthony Knight
Assistant Examiner—John L. Beres
(74) Attorney, Agent, or Firm—Young & Basile, P.C.

(57) ABSTRACT

A seal assembly especially suitable for use as the sealing element in the annular cylindrical bore of a concentric cylinder assembly. The seal assembly includes an annular insert structure of rigid material and an annular seal member of elastomeric material bonded to the insert structure. The annular insert structure has an I-beam cross-sectional configuration including an outer annular flange structure centered on an axis, an inner annular flange structure centered on the axis concentrically within the outer annular flange structure, and annular web structure extending radially between the inner and outer annular flange structures. The web structure coacts with the flange structures to define left and right continuous annular grooves in the left and right faces of the insert structure and defines a plurality of circumferentially spaced holes extending axially through the web structure between the left and right grooves. The annular elastomeric seal member fills the left and right grooves, fills the web structure holes, and extends to one side of the insert structure to form inner and outer annular sealing surfaces for coaction with the respective annular surfaces of the annular cylindrical bore.

5 Claims, 4 Drawing Sheets

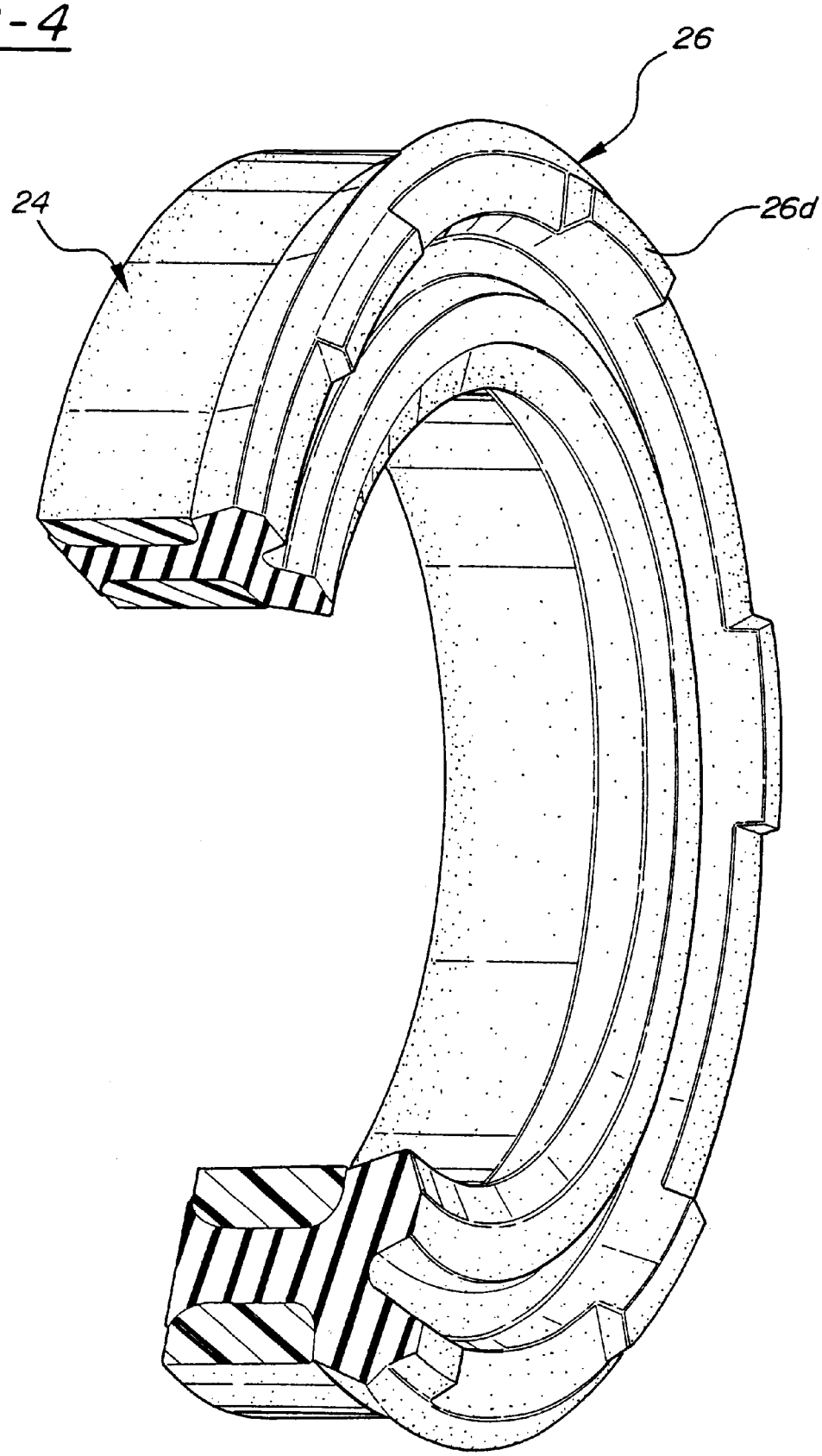

SEAL ASSEMBLY FOR ANNULAR HYDRAULIC CYLINDER

FIELD OF THE INVENTION

This invention relates to a seal assembly and more particularly to a seal assembly especially suitable for use as the seal element in an annular hydraulic cylinder and piston assembly such, for example, as a concentric sleeve cylinder assembly for operating the throw-out bearing of a vehicular clutch.

In a concentric slave cylinder an annular piston is slidably positioned in an annular cylindrical bore and an annular seal element is positioned in the annular bore and acts in association with the piston to define a hydraulic fluid pressure chamber on the power side of the piston. Whereas various annular seal designs have been proposed for use in concentric slave cylinders, each of the prior art designs has suffered from one or more disadvantages. Specifically, the prior art seals have had an excessively complicated and expensive construction; and/or the prior art seals have provided only a relatively short product life; and/or the prior art seals have had a tendency to cock in the cylindrical bore so as to complicate their insertion in the bore and derogate the sealing performance of the seal in the bore; and/or the prior art seals have generated excessive friction and squirming as between the seal and the bore; and/or the prior art seals have exhibited an excessive system hysteresis effect.

SUMMARY OF THE INVENTION

This invention is directed to a concentric seal that is especially suitable for use in a concentric slave cylinder.

This invention is more specifically directed to a concentric seal that is simple and inexpensive in construction; that performs satisfactorily over a long product life; that is resistant to cocking in the cylinder bore; that generates a minimum of friction between the seal and the cylindrical bore; and that reduces the system hysteresis effect.

The seal element of the invention comprises a seal assembly including an annular insert structure formed of a rigid material and an annular seal member formed of an elastomeric material and bonded to the insert structure. The insert structure includes an annular outer structure, an annular inner structure, left and right annular radial faces, and a continuous annular groove in the right radial face. The elastomeric annular seal member fills the groove in the insert and extends to the right of the insert structure to form a seal structure defining an outer annular sealing surface having a relaxed configuration positioned radially outwardly and to the right of the annular outer insert structure and an inner annular sealing surface having a relaxed configuration radially inwardly and to the right of the annular inner insert structure. This basic seal design provides a simple and inexpensive construction; minimizes cocking of the seal assembly in the bore; minimizes friction as between the seal and the bore; and reduces the system hysteresis effect.

According to a further feature of the invention, the insert structure further defines a plurality of circumferentially spaced holes extending axially through the insert structure from the groove to the left annular radial face and the elastomeric material fills the holes. This specific arrangement ensures a positive bonding of the elastomeric material to the rigid material of the insert structure.

According to further feature of the invention, the insert structure further defines a continuous annular groove in the left annular radial face of the inside structure; the holes extend between the left and right grooves; and the elastomeric material fills the left groove. This specific interrelationship between the elastomeric material and the structure of the insert further enhances the bond between the elastomeric material and the insert.

According to further feature of the invention, the insert structure has an I-beam cross-sectional configuration including an outer annular flange structure forming the annular outer structure, an inner annular flange structure forming the annular inner structure, and an annular web structure extending radially between the inner and outer flange structures and having a left face coacting with left portions of the inner and outer annular flange structures to form the left groove and coacting with right portions of the inner and outer annular flange structure to form the right groove; and the holes extend through the web structure and connect with the left and right grooves. This specific I-beam construction for the insert structure provides strength to the assembly and facilitates the bonding of the elastomeric material to the insert structure.

In disclosed embodiment of the invention, the seal structure is free to flex in a sealing scenario to allow the inner annular sealing surface to assume a working position in approximate axial alignment with the radially inner annular surface of the inner flange structure and allow the outer annular sealing surface to assume a working position in approximate axial alignment with the radially outer annular surface of the outer flange structure, and the seal structure defines an annular groove between the inner and outer sealing surfaces to facilitate flexing movement of the inner and outer sealing surfaces to their working positions.

BRIEF DESCRIPTION OF THE DRAWINGS

FIG. 4 is a fragmentary view of the seal assembly;

DETAILED DESCRIPTION OF THE PREFERRED EMBODIMENT

Figure 1:
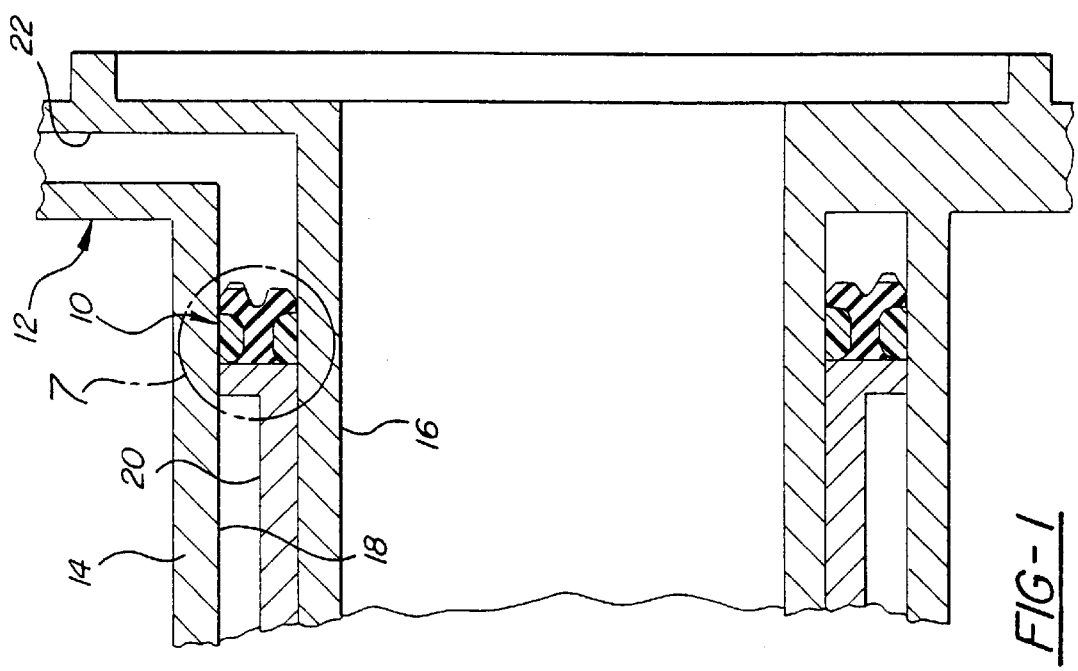
FIG. 1 is a fragmentary and somewhat diagrammatic view of a concentric piston and cylinder assembly employing a seal assembly according to the invention.

The invention seal assembly 10 is seen in FIG. 1 in use in an angular hydraulic cylinder and piston assembly, such for example as a slave cylinder assembly for operating the throw-out bearing of a vehicular clutch wherein the cylinder and piston assembly is disposed concentrically around the drive shaft connecting the clutch to the gear box of the vehicle.

The slave cylinder assembly includes a housing 12 provided with concentric tubular members 14 and 16 preferably cast integrally with housing 12. Members 14 and 16 coactively define an annular cylindrical chamber 18, and an annular piston 20 is slidably positioned in chamber 18. Seal assembly 10 is disposed in chamber 18 on one side of annular piston 20 so that hydraulic fluid introduced into the annular chamber 18 through a passageway 22 in housing 12 displaces the seal assembly 10 and piston 20 to the left as seen in FIG. 1, thereby displacing to the left a throw-out bearing engaged by the free end of the annular piston. The throw-out bearing in turn engages the release fingers of the clutch of the vehicle in known manner to disengage the clutch. When hydraulic fluid is withdrawn from chamber 18, piston 20 is allowed to be displaced to the right under the action of the clutch spring fingers and the clutch is reengaged in known manner. A plane cylinder assembly of the type shown in FIG. 1 is disclosed for example in U.S. Pat. No. 4,577,549 assigned to the assignee of the present invention.

Seal assembly 10 includes an annular insert member 24 and an annular elastomeric member 26.

Figure 5:
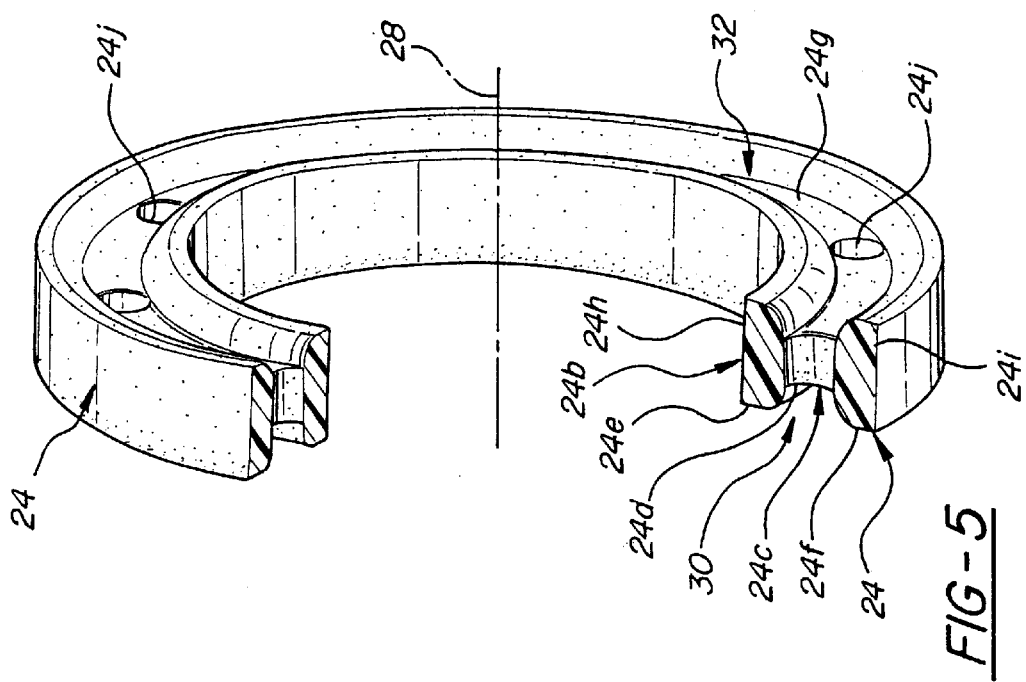
FIG. 5 is a fragmentary view of an insert structure employed in the seal assembly.

Annular insert member 24 (FIG. 5) is formed in a suitable injection molding process of a suitable plastic material such as a glass reinforced plastic or a mineral filled plastic. Insert member 24 is in the form of a ring member and has an I-beam cross-sectional configuration including an outer annular flange structure 24a centered on an axis 28, an inner annular flange structure 24b centered on the axis concentrically within the outer annular flange structure, and an annular web structure 24c extending radially between the inner and outer annular flange structures. Web structure 24c has a left annular radial face 24d coacting with left portions 24e, 24f of the inner and outer annular flange structures to define a left continuous annular groove 30 and has a right annular radial face 24g coacting with right portions 24h and 24i of the inner and outer flange structures to define a right continuous annular groove 32. Web structure 24c further defines a plurality of circumferentially spaced circular holes 24j extending axially through the web structure between the left and right grooves. Holes 24j may have any desired diameter but preferably, and as shown, extend the full height of the web structure.

Figure 6:
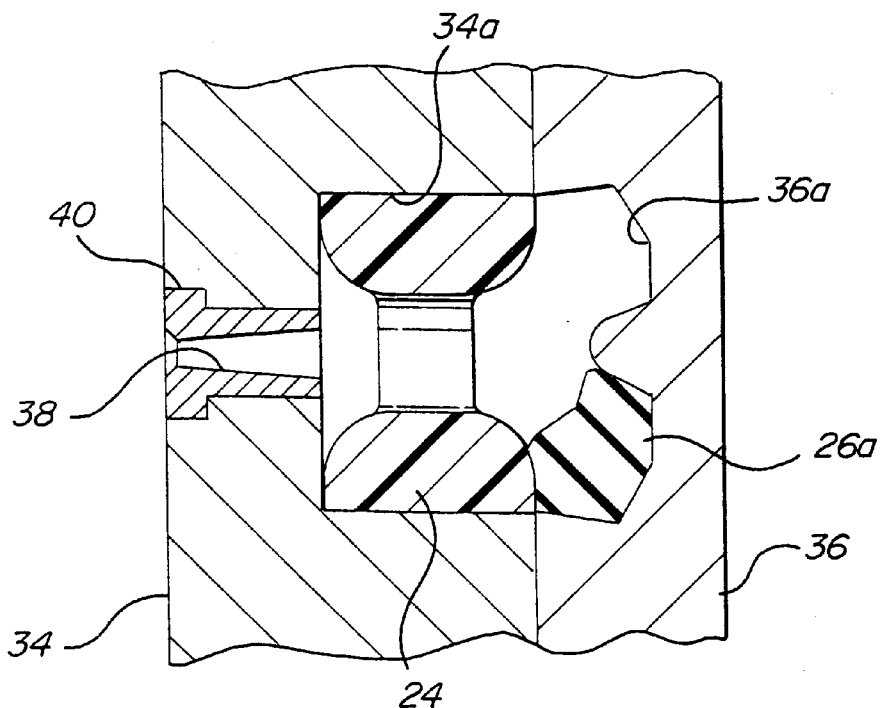
FIG. 6 is a diagrammatic view showing the formation of the seal assembly.

Following the injection molding of ring member 24, the ring member is coated with a suitable adhesive or bonding agent and placed in a suitable mold where, in a known flashless molding process, elastomeric material is molded around the insert member. More specifically, and as seen in FIG. 6, ring member 24 is positioned in an annular mold cavity 34a defined by a mold part 34; a further mold part 36 is affixed to mold part 34 and defines a mold cavity 36a coacting with mold cavity 34a to define the complete mold cavity; and elastomeric material in molten form is injected into the mold cavity through a sprue 38 defined by a sprue bushing 40 positioned in mold part 34. The molten elastomeric material flows through sprue 38 and into mold cavity 34a, 36a and specifically fills groove 30, fills holes 24j, fills groove 32, and fills mold cavity 36a to define a seal structure 26a. Once the elastomeric material has set up, mold parts 36 and 34 are separated and the seal assembly comprising ring member 24 and elastomeric member 26 molded thereto is removed from the mold.

Figure 2:
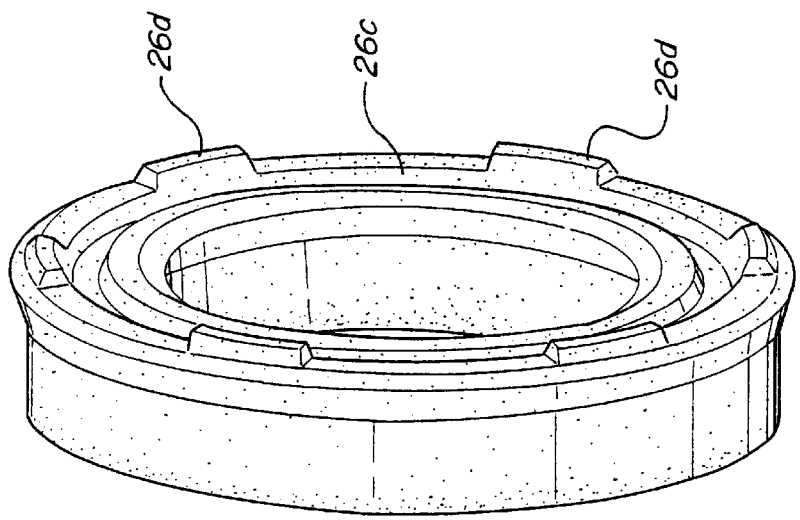
FIGS. 2 and 3 are perspective views of the seal assembly.
Figure 3:
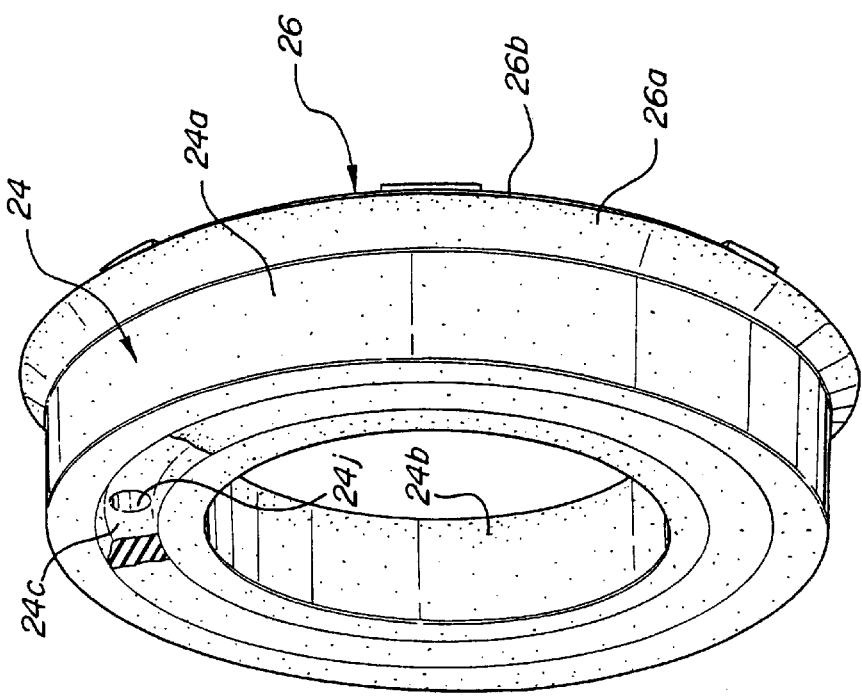

In the final configuration of the seal assembly, elastomeric material fills the left groove 30; fills the circumferentially spaced holes 24j; fills the right groove 32; and extends to the right of the ring member 24 (as viewed in the drawings) to define the seal structure 26a. Seal structure 26a (FIGS. 2, 3 and 4) defines an outer annular lip sealing surface 26b having a relaxed configuration positioned radially outwardly and to the right of the annular outer insert structure 24a and an inner annular lip sealing surface 26b having a relaxed configuration radially inwardly and to the right of the annular inner insert structure 24b. Seal structure 26 further defines an annular groove 26c between the inner and outer lip sealing surfaces to facilitate flexing movement of the inner and outer sealing surfaces between their relaxed and their working positions. Seal structure 26 further desirably includes a plurality of circumferentially spaced spacer portions 26d.

Figure 7:
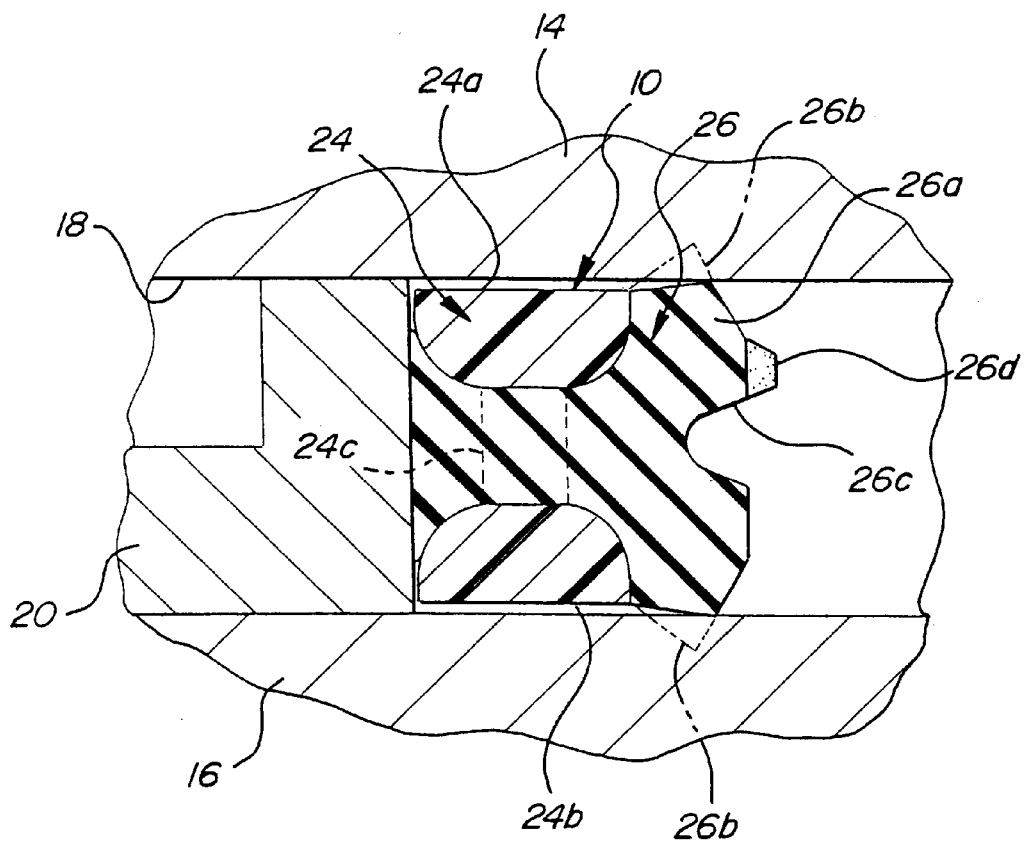
FIG. 7 is a fragmentary view taken within the circle 7 of FIG. 1.

In use in a concentric slave cylinder assembly, and as best seen in FIGS. 1 and 7, seal assembly 10 is received in annular bore 18 with insert member 24 maintaining a running clearance with the concentric walls defining the annular bore and with lip sealing surfaces 26a and 26b sealingly engaging the inner and outer annular surfaces of the bore to define a fluid pressure chamber in the right side of the bore acting to urge the seal assembly and the piston to the left to actuate the clutch in known manner. Spacers 26 operate to prevent movement of the seal structure to a position at the extreme right end of bore 18 where pressurized fluid entering passage 22 would have no access to the right face of the seal. The seal structure is shown in its relaxed configuration by the dash lines in FIG. 7 and is shown by the solid lines in FIG. 7 in its working position in sealing engagement with the inner and outer annular surfaces defining the annular bore.

The seal assembly of the invention will be seen to minimize the disadvantages of the prior art seal assemblies. Specifically, the invention seal assembly is simple and inexpensive in construction; the invention seal assembly is durable and provides a long product life; the invention seal assembly, by virtue of the close running clearance between the rigid insert member and the walls of the bore, is precluded from cocking in the bore; the strength and rigidity provided by the insert member precludes excessive squirming of the elastomeric material as the seal assembly moves in the bore whereby to minimize friction in the seal assembly; and the invention seal assembly, by virtue of its smooth, low friction non-squirming movement in the cylinder bore, minimizes the system hysteresis effect.

Whereas a preferred embodiment of the invention has been illustrated and described in detail, it will be apparent that various changes may be made in the disclosed embodiment without departing from the scope or spirit of the invention.

What is claimed is:

1. A seal assembly comprising:

an annular insert structure of rigid material centered on an axis and having an annular outer structure, an annular inner structure, left and right annular radial faces, and a continuous annular right groove in said right radial face; and an annular seal member of elastomeric material bonded to the insert structure, filling said right groove, and extending to the right of the insert structure to form a seal structure defining an outer annular sealing surface having a relaxed configuration positioned radially outwardly and to the right of the annular outer insert structure and an inner annular sealing surface having a relaxed configuration radially inwardly and to the right of the annular inner insert structure;

the insert structure further defining a continuous annular left groove in the left annular radial face of the insert structure;

the insert structure having an I-beam cross-sectional configuration having left-right symmetry and including an outer annular flange structure forming the annular outer structure, an inner annular flange structure forming the annular inner structure, and an annular web structure extending radially between the inner and outer flange structures and having a left face coacting with left portions of the inner and outer annular flange structures to form the left groove and coacting with right portions of the inner and outer annular flange structures to form the right groove;

the insert structure further defining a plurality of circumferentially spaced holes extending through the web structure and connecting the left and right grooves;

the elastomeric material filling the left groove and filling the holes whereby to interconnect the elastomeric material in the left groove with the elastomeric material in the right groove.

2. A seal assembly according to claim 1 wherein:

the left and right grooves are symmetrical.

3. A seal assembly comprising:

an annular insert structure of rigid material having an I-beam cross-sectional configuration having left-right symmetry and including an outer annular flange structure centered on an axis, an inner annular flange structure centered on the axis concentrically within the outer annular flange structure, and an annular web structure extending radially between the inner and outer annular flange structures, having a left annular radial face coacting with left portions of the inner and outer annular flange structures to define a left annular groove, having a right annular radial face coacting with right portions of the inner and outer flange structures to define a right annular groove that is symmetrical with respect to the left annular groove, and defining a plurality of circumferentially spaced holes extending axially through the web structure between the left and right grooves; and an annular seal member of elastomeric material bonded to the insert structure, filling the left groove, filling the right groove, filling the web structure holes, and extending to the right of the insert structure to form a seal structure defining an outer annular sealing surface having a relaxed configuration positioned radially outwardly and rightwardly of the radially outer annular face of the outer flange structure and an inner annular sealing surface having a relaxed configuration radially inwardly and rightwardly of the radially inner annular surface of the inner flange structure.

4. A seal assembly according to claim 3 wherein:

the seal structure is free to flex in a sealing scenario to allow the inner annular sealing surface to assume a working position in approximate axial alignment with the radially inner annular surface of the inner flange structure and allow the outer annular sealing surface to assume a working position in approximate axial alignment with the radially outer annular surface of the outer flange structure.

5. A seal assembly according to claim 4 wherein:

the seal structure defines an annular groove between the inner and outer sealing surfaces to facilitate flexing movement of the inner and outer sealing surfaces to their working positions.

* * * * *